United States Patent [19]

Balko et al.

[11] 4,094,669

[45] June 13, 1978

[54] POLYTETRAFLUOROETHYLENE MEMBRANE FILTERS FOR MERCURY RECOVERY

[75] Inventors: Edward Nicholas Balko, Trenton; Shyam Dattatreya Argade, Woodhaven, both of Mich.

[73] Assignee: BASF Wyandotte Corporation, Wyandotte, Mich.

[21] Appl. No.: 645,969

[22] Filed: Jan. 2, 1976

[51] Int. Cl.² .................. B01D 13/00; C22B 43/00
[52] U.S. Cl. .................................. 75/108; 210/38 B; 210/23 F; 75/121; 423/562
[58] Field of Search .................. 210/38 B, 50, 63 R, 210/22, 23 F; 75/108, 121; 423/101, 102, 562, 565

[56] References Cited

U.S. PATENT DOCUMENTS

| | | | |
|---|---|---|---|
| 3,674,428 | 7/1972 | Dean et al. | 210/50 X |
| 3,695,838 | 10/1972 | Knepper et al. | 75/108 X |
| 3,718,457 | 2/1973 | Entwisle et al. | 423/562 X |
| 3,736,253 | 5/1973 | Angelis et al. | 210/40 X |
| 3,749,761 | 7/1973 | Dean et al. | 210/40 X |
| 3,836,442 | 9/1974 | Dean et al. | 423/562 X |

*Primary Examiner*—Frank A. Spear, Jr.
*Assistant Examiner*—E. Rollins Cross
*Attorney, Agent, or Firm*—John W. Linkhauer; Bernhard R. Swick; Robert E. Dunn

[57] ABSTRACT

An improvement in the recovery of mercury from aqueous streams is achieved by the use of polytetrafluoroethylene filters.

11 Claims, No Drawings

POLYTETRAFLUOROETHYLENE MEMBRANE FILTERS FOR MERCURY RECOVERY

BACKGROUND OF THE INVENTION

1. Field of the Invention

The present invention relates to the recovery of mercury from aqueous streams. More particularly, the present invention relates to improvements in the recovery of mercury from aqueous streams by filtration through polytetrafluoroethylene membrane filters.

2. Description of the Prior Art

The mercury type electrolytic cell for the production of chlorine and caustic has been used primarily because of the high purity caustic soda which is produced. Recently, it has been found, however, the loss of mercury from the effluent streams issuing from these electrolytic cells has created ecological problems. Furthermore, the loss of mercury is a costly expenditure in the caustic and chlorine producing plants. Accordingly it is imperative that means be found for the removal of mercury and/or other heavy metal ions from liquid streams. It is generally accepted procedure to precipitate heavy metals from solution and collect them on a precoated filter medium. This filter medium becomes contaminated with insolubles and must be removed to allow for further filtration. Furthermore, it is desirable to recover the mercury to derive some economic benefits from the filtration process. A number of patents among which are U.S. Pat. Nos. 3,843,570 and 3,258,398 teach the use of polytetrafluoroethylene membranes as filtration mediums. There is, however, no teaching that such membranes could be employed to filter out finely divided mercuric sulfide or metallic mercury from plant effluent streams.

SUMMARY OF THE INVENTION

It has been discovered that pre-wetted membrane filters constructed of polytetrafluoroethylene may be efficiently employed for the filtration of aqueous streams containing either insoluble mercury salts or metallic mercury.

DESCRIPTION OF THE PREFERRED EMBODIMENT

The use of a wetted expanded polytetrafluoroethylene membrane filter for the filtration of both mercury sulfide and metallic mercury has proven to be very efficient. The porosity of the membrane filter may range from about 0.2 $\mu$ to about 3.0 $\mu$. This is particularly effective for the recovery of mercury from a plant effluent stream. A preferred process for such recovery comprises:

(a) precipitating the mercury in the effluent as the sulfide,
(b) separating the mercury sulfide from said stream by filtration,
(c) reacting the mercury sulfide with a sufficient amount of oxidant,
(d) reducing the mercury to the metallic state with a sufficient amount of reducing agent, and
(e) collecting the metallic mercury on a membrane filter.

The mercury in the plant effluent stream is conveniently concentrated by treatment of the stream with any suitable sulfide source, e.g., NaHS. The stream is then filtered through a paper filter coated with a cellulose filter precoat. Optionally the filtration may be carried out with a polytetrafluoroethylene filter. The filter cake is then dispersed in a saturated or near saturated sodium chloride solution. The finer the dispersion of the HgS in the solutions the more readily it can be oxidized. This slurry is then reacted with aqueous sodium hypochlorite or gaseous chlorine bubbled through the solution. The gaseous chlorine addition may be controlled by the process disclosed in a copending application Ser. No. 649,817, now U.S. Pat. No. 4,012,297 the disclosure of which is hereby incorporated by reference. In the case of sodium hypochlorite it has been found that a ratio of about 3 to about 6 moles of sodium hypochlorite to each mole of mercury sulfide is required to ensure complete oxidation.

The optimum pH range for this oxidation is from about 8 to about 11. Below this range the chlorine oxidant attacks the cellulose of the filter matrix at a rapid rate while above pH 11, some mercury can be reprecipitated in the form of the oxide, depending on the reaction conditions.

After complete oxidation of the mercury, the excess oxidant is removed from solution by either acidification, air sparging, or reaction with sodium thiosulfate or sodium bisulfite. The pH of the solution is then adjusted, if necessary, to a pH range of from about 8 to about 11 by the addition of NaOH or $Na_2CO_3$. A quantity of reductant, such as sodium borohydride or aluminum, from about 1.2 to 2 times that required to reduce all of the mercury salt to metallic mercury, is added to the solution. The solution containing the finely divided mercury metal is then filtered through a polytetrafluoroethylene filter membrane, nominal pore size from about 0.2 micron to about 3 microns. In order to obtain reasonable flow rates through the membrane filter without inordinately high pressure, with all of its undesirable side effects, the membrane is wetted either with a solvent or with a suitable wetting agent in a solvent. Among those which may be employed are solvents such as methanol, ethanol, acetone and isopropanol. These solvents, however, can create problems if the membrane filter is mounted on a rubber-lined filter holder. This problem can be overcome by treating the membrane with a solution of a nonionic surfactant in the solvents and then allowing the solvent to evaporate from the membrane. Among those surfactants which can be employed are oxyethylated primary alcohols containing from about 10 to 22 carbon atoms in the alcohol chain and from about 20 weight percent to about 80 weight percent ethylene oxide. After filtration the metallic mercury is removed from the filter cloth surface and returned to the mercury cell.

Among the reductants which may be employed for the reduction of mercury salts to metallic mercury are sodium borohydride, hydrazine, hydroxylamine, aluminum metal, iron metal, zinc metal, soluble stannous salts, hydrogen peroxide and formaldehyde. Those preferred are sodium borohydride, hydrazine, hydroxylamine and aluminum metal.

The following Examples are provided to further illustrate the invention. Parts and percents are by weight unless otherwise indicated.

EXAMPLE 1

A synthetically prepared 200 ml aqueous solution of sodium chloride 150 grams/liter containing 1050 ppm of mercuric chloride was reacted with 1 gram of 20 mesh aluminum granules at a pH of about 3, at 25° Centigrade. As the reaction progressed, a quantity of Al(OH)$_3$ was also produced. At the end of about seventeen hours, the solution was filtered through a polytetrafluoroethylene membrane filter of 0.2 micron porosity. This filter is sold under the trademark "GORE-TEX" by W. L. Gore Associates, Inc., Newark, Delaware. The filter had previously been wetted with acetone. The results showed that 99.7 percent of mercury was removed from the solution.

EXAMPLE 2

A synthetically prepared aqueous solution containing 2525 ppm HgCl$_2$, 150 grams/liter NaCl, and 1.8 grams/liter Na$_2$SO$_4$ was reacted at a pH of 9 with an amount of NaBH$_4$, which was 1.58 times the stoichiometric amount required for reduction of the mercury for a period of 15 minutes. Finely divided mercury droplets appeared immediately in the solution. The suspension was filtered through a "GORE-TEX" polytetrafluoroethylene membrane filter of 0.2 micron nominal pore size. The membrane filter was previously wetted by soaking in a 50 percent isopropanol solution of a nonionic surfactant composed of an ethoxylated primary alcohol. The membrane was then allowed to air dry for about 24 hours before use. Analysis of the filtrate revealed that 99 percent of the mercury had been removed from the liquid.

EXAMPLE 3

A synthetically prepared aqueous solution containing 200 ppm HgCl$_2$, 150 grams/liter NaCl, and 1.4 grams/liter Na$_2$SO$_4$ was reacted with a two-fold excess of NaBH$_4$ for 15 minutes. After filtering through a "GORE-TEX" polytetrafluoroethylene membrane filter of 0.2 micron nominal pore size which was wetted as in Example 2, analysis of the filtrate revealed 99.8% of the mercury had been removed from the solution.

EXAMPLES 4–7

Aqueous plant effluent streams of brine containing 150 grams/liter NaCl were treated with a quantity of NaHS sufficient to provide an excess of 14 ppm over that required to precipitate all of the mercury present. These solutions containing the designated quantities of mercury were filtered through "GORE-TEX" polytetrafluoroethylene filters of various porosities and filtration rates which were wetted as in Example 2. The results in Table I indicate that the effluent contained less than 0.1 ppm of mercury.

Table 1

| Example No. | Pore Size $\mu$ | Filtration Rate Gallons/min/ft$^2$ of Filter | Hg Concentration Influent, ppm | Hg Concentration Effluent, ppm |
|---|---|---|---|---|
| 4 | 0.5 | 0.72 | 16 | 0.07 |
| 5 | 1.0 | 0.50 | 47 | <0.05 |
| 6 | 3 | 1.03 | 23.5 | 0.06 |
| 7 | 3 | 0.60 | 500 | 0.09 |

EXAMPLES 8–15

Aqueous plant effluent streams of brine containing 150 grams/liter NaCl were treated with NaHS according to the procedure of Examples 4–7. These solutions containing about 55 ppm mercury suspended as mercury sulfide were filtered through both paper and wetted GORE-TEX polytetrafluoroethylene filters. The paper filter requires a cellulose pre-coat in order to retain the mercury sulfide. The polytetrafluoroethylene filter had a nominal pore size of 0.2 micron. The polytetrafluoroethylene membrane filter, which was wetted as in Example 2, displayed both a higher filtrate rate and improved retention ability. The results are shown in Table II.

Table II

| | Polytetrafluoroethylene Filter | | Paper Filter | |
|---|---|---|---|---|
| Ex. | Filtration Rate Gallons/min/ft.$^2$ | Hg Concentration Effluent, ppm | Filtration Rate Gallons/min/ft.$^2$ | Hg Concentration Effluent, ppm |
| 8 | .53 | 0.011 | .25 | .21 |
| 9 | .70 | 0.018 | .27 | .03 |
| 10 | .57 | 0.009 | .27 | .10 |
| 11 | 1.13 | 0.010 | .34 | .14 |
| 12 | .80 | 0.013 | .23 | .09 |
| 13 | .67 | 0.021 | .22 | .29 |
| 14 | .58 | 0.015 | .23 | .03 |
| 15 | .66 | 0.012 | .23 | .01 |

EXAMPLES 16–18

Aqueous plant effluent streams of brine containing 150 grams/liter NaCl were treated with NaHS according to the procedure of Examples 4–7. These solutions containing about 55 ppm mercury sulfide were filtered through a "GORE-TEX" polytetrafluoroethylene filter membrane of 33.5 inch diameter, 0.4 mil thickness and nominal 0.2 micron pore size. The filter had previously been wetted by treatment with a 50-50 mixture of PLURAFAC RA-30[1] and isopropanol and then allowed to dry for 24 hours. The filter membrane was placed into the filter feed line between two flanges with a polyethylene screen and a metal grating. The temperature of the effluent stream was between 50-60° F. The volume of liquid filtered and the filtration rates were as indicated below in Table III. The efficiency of the filter membrane is shown by the final mercury concentration of the effluent stream.

(1) PLURAFAC RA-30 is the trademark for a nonionic ethoxylated primary alcohol surfactant sold by BASF Wyandotte Corporation, Wyandotte, Michigan.

Table III

| Example | Average Pressure In | Average Pressure Out | Total Volume, Gals. | Filtration Rate Gallons/min./ft.$^2$ | Final Hg Conc., ppm |
|---|---|---|---|---|---|
| 16 | 13.8 | 3.3 | 15,600 | .24 | .01 |
| 17 | 34.9 | 2.6 | 17,200 | .16 | .02 |
| 18 | 46.0 | 4.0 | 17,000 | .08 | .01 |

EXAMPLE 19

A mercury amalgam plant effluent stream containing both soluble mercury and metallic mercury was treated with a quantity of NaHS according to the procedure of Examples 4–7. The stream was then filtered through a "GORE-TEX" polytetrafluoroethylene membrane filter, nominal pore size 0.2 microns. The filter cake was then dispersed in an aqueous solution of 300 grams/liter of sodium chloride. This solution of 21 liters contained 5.5 grams/liter of Hg suspended in the solution. The solution was then treated with an amount of sodium hypochlorite which was 1.5 times the theoretical amount required for complete oxidation of the HgS. This amounts to about 6 moles of sodium hypochlorite per mole of HgS. The solution was then acidified by the addition of hydrochloric acid, and air was bubbled through the solution to remove the excess chlorine gas.

The pH of the solution was then adjusted to 9. To this solution was added 54.25 grams of an aqueous solution of sodium borohydride and the reaction mixture was then agitated for 30 minutes. The solution was filtered through a 0.2 micron nominal pore size "GORE-TEX" polytetrafluoroethylene membrane filter on a Büchner filter funnel. The membrane filter was previously wetted as in Example 2. The filtrate contained 15 ppm mercury, a reduction of 99.7 percent. The solids on the filter were mainly metallic mercury with a small residue of mercury sulfide.

The embodiments of the invention in which an exclusive property or privilege is claimed are defined as follows:

1. The process for the recovery of mercury from a plant effluent stream comprising:
   (a) precipitating the mercury as the sulfide,
   (b) separating the mercury sulfide from said stream by filtration,
   (c) reacting the mercury sulfide with a sufficient amount of oxidant,
   (d) reducing the mercury to the metallic state with a sufficient amount of reducing agent, and
   (e) collecting the metallic mercury on a polytetrafluoroethylene filter.

2. The process of claim 1 wherein the mercury sulfide is filtered on a paper filter.

3. The process of claim 1 wherein the mercury sulfide is filtered on a polytetrafluoroethylene filter.

4. The process of claim 1 wherein the oxidant is sodium hypochlorite.

5. The process of claim 1 wherein the oxidant is chlorine.

6. The process of claim 1 wherein the reducing agent is sodium borohydride.

7. The process of claim 1 wherein the reduction is at a pH from about 8 to about 11.

8. The process of claim 1 wherein the polytetrafluoroethylene filter has a pore size from about 0.2 $\mu$ to about 3.0 $\mu$.

9. The process of claim 1 wherein the reducing agent is aluminum.

10. The process of claim 1 wherein the reducing agent is hydrazine.

11. The process of claim 1 wherein the reducing agent is hydroxylamine.

* * * * *